United States Patent [19]

Hiramatsu et al.

[11] Patent Number: 5,625,650
[45] Date of Patent: Apr. 29, 1997

[54] SYNCHRONOUS ADDER DEVICE

[75] Inventors: Katsuhiko Hiramatsu; Kazunori Inogai, both of Yokohama; Kimihiko Ishikawa, Funabashi, all of Japan

[73] Assignee: Matsushita Electric Industrial Co., Ltd., Osaka, Japan

[21] Appl. No.: 313,614

[22] Filed: Sep. 30, 1994

[30] Foreign Application Priority Data

Nov. 16, 1993 [JP] Japan .................... 5-308582

[51] Int. Cl.$^6$ .................... H04L 27/14
[52] U.S. Cl. .................... 375/335; 375/343; 375/349; 375/350; 375/355
[58] Field of Search .................... 375/260, 263, 375/275, 276, 335, 343, 349, 350, 355; 370/20, 69.1, 122, 123

[56] References Cited

U.S. PATENT DOCUMENTS

| | | | |
|---|---|---|---|
| 4,601,045 | 7/1986 | Lubarsky | 375/275 |
| 4,737,728 | 4/1988 | Nakamura et al. | 375/328 |
| 5,323,391 | 6/1994 | Harrison | 375/349 |

Primary Examiner—Stephen Chin
Assistant Examiner—Don Vo
Attorney, Agent, or Firm—Watson Cole Stevens Davis, P.L.L.C.

[57] ABSTRACT

A synchronous adder device comprising an A/D converter for digitizing a receive signal transmitted through a plurality of subcarriers by sampling it and an adding unit for determining the value of synchronous addition for each sample is provided with synthetic waveform shaping filters for waveform-shaping every other subcarrier, squaring units for squaring the respective outputs of the synthetic waveform shaping filters, and a low pass filter for removing a harmonic components from the sum of outputs of the squaring units. In the case where the signal is transmitted through four subcarriers, synchronous addition becomes possible by using the synthetic waveform shaping filters the number of which is two for each of an I signal and a Q signal or is four in total. The number of squaring units equal to the number of synthetic waveform shaping filters suffices. Though an output of the squaring unit includes an envelope component and harmonic components since the squaring unit squares signals of the plurality of subcarriers together, the harmonic components can be removed by the low pass filter, thereby making it possible to extract only the envelope component.

8 Claims, 5 Drawing Sheets

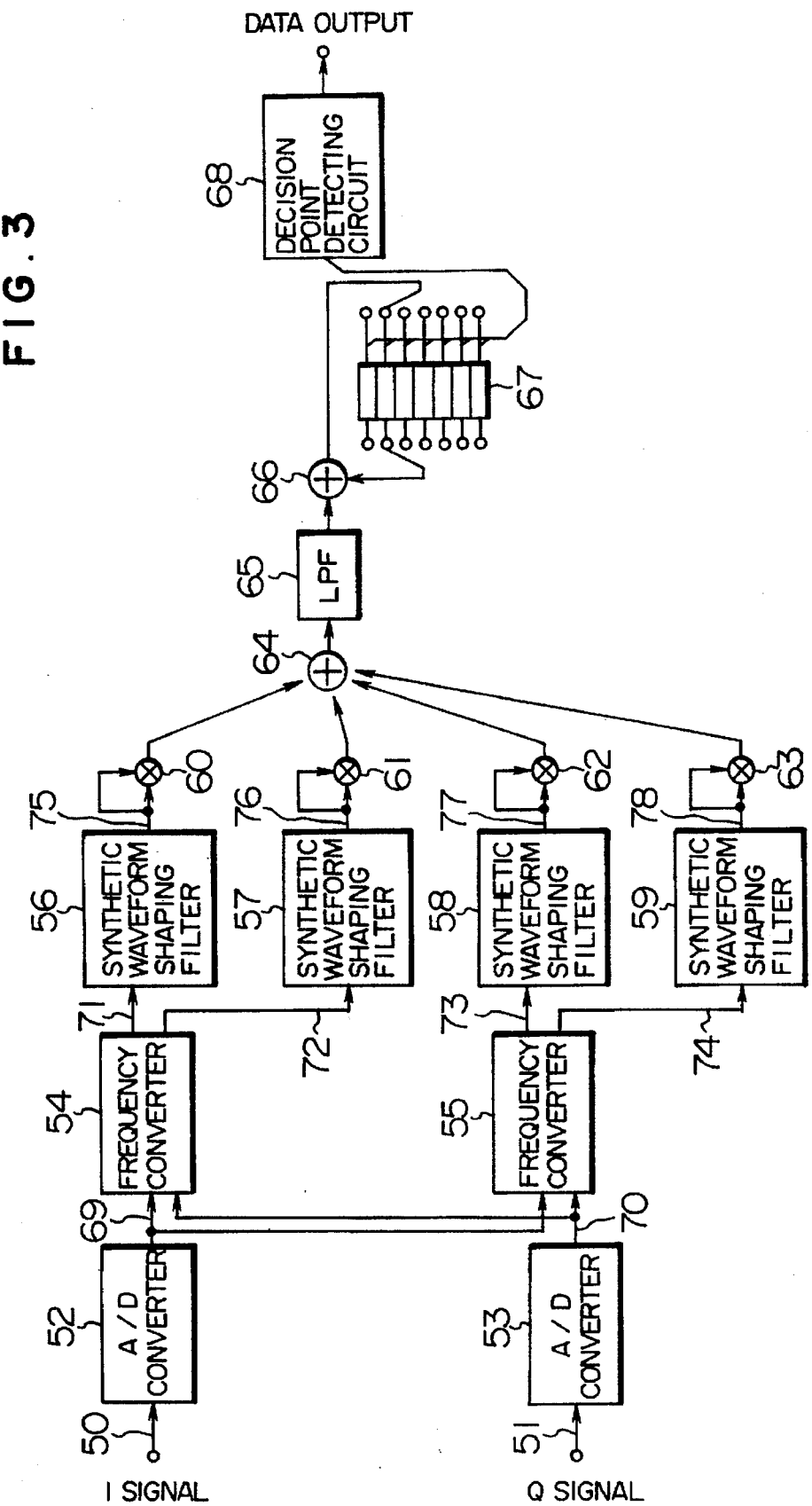

SYNCHRONOUS ADDER DEVICE

BACKGROUND OF THE INVENTION

1. Field of the Invention

The present invention relates to a synchronous adder device for making synchronous addition for the power of a sampled receive signal for symbol identification, for example, in a receiver for digital communication, and more particularly to such a synchronous adder device which is realized with small circuit scale.

2. Description of the Related Art

On a receiving side in the digital communication, a receive signal level at a point of time corresponding to the instant of time of transmission of a symbol ("1" or "0") on a transmitting side is extracted from a receive signal. The extracted signal level is compared in magnitude with a threshold value to reproduce an original symbol.

In the case where digital data is transmitted in a narrow band, transmission with Nyquist characteristic is made and both a transmitting side and a receiving side generally use filters which have the same Nyquist characteristic. In such digital transmission, so long as a limiter amplifier is not used as a receiving amplifier, a symbol timing for extracting a symbol from a receive signal can be obtained from a point at which an envelope of the receive signal becomes the maximum.

On the receiving side, the receive signal is digitized at a sampling frequency which is N (integer) times as high as a symbol clock (or symbol transmission frequency). Thereafter, the square value of each sample is calculated and the square value for every N-th sample in such digitized samples is subjected to synchronous addition so that the every N-th sample providing the maximum value of addition is detected as a sample representing a transmit symbol.

In the digital communication, multivalued transmission using a plurality of subcarriers with carrier frequencies slightly shifted from a center frequency is made in order to improve the efficiency of communication. In the case of this communication system, the performance of detection of a symbol timing can be improved by using the sum of envelopes of the respective subcarriers.

The conventional synchronous adder device for performing the above-mentioned synchronous addition is shown in FIG. 1. The device includes an A/D converter 2 for digitizing an in-phase component (or I signal) 1 of a receive signal for each subcarrier at a sampling frequency which is N times as high as a symbol clock, an A/D converter 4 for digitizing an orthogonal component (or Q signal) 3 of the receive signal for each subcarrier at the above-mentioned sampling frequency, frequency converters 7 to 10 for performing frequency conversion corresponding to the respective subcarriers so that the center frequencies of digitized signals 5 or 6 of the respective subcarriers coincide with each other or both the signals 5 and the signals 6 of the respective subcarriers have the same center frequency, waveform shaping filters 11 to 18 for waveform-shaping the I and Q signals of each subcarrier having the same or coincident center frequency by use of a common filtering characteristic, squaring circuits 27 to 34 for squaring the waveform-shaped signals 19 to 26, respectively, an adder 35 for adding the outputs of the squaring circuits 27 to 34, an adding circuit 36 for adding the output of the adder 35 to the previous cumulative or integrated value of the corresponding sampling interval, a memory 37 for storing the result of addition by the adding circuit 36 separately for each sampling interval, and a decision point detecting circuit 38 for detecting a sample in a sampling interval which provides the maximum result of addition.

The device of FIG. 1 shows the construction in the case where data is transmitted through four subcarriers and the A/D conversion is made by an over-sampling of N=7 or at a sampling frequency which is seven times as high as the symbol clock.

In this synchronous adder device, data transmitted through four subcarriers is inputted to the A/D converters 2 and 4 after separation thereof into an I signal 1 and a Q signal 3 through quadrature detection. The A/D converters 2 and 4 digitize the I signal 1 and the Q signal 3, respectively, at the sampling frequency which is seven times as high as the symbol clock.

Then, the digitized I and Q signals 5 and 6 are inputted to the frequency converters 7 to 10. Since the four subcarriers have their carrier angular frequencies which are respectively shifted from the center frequency by $-3\Delta\omega$, $-\Delta\omega$, and $3\Delta\omega$, the frequency converters 7 to 10 subject the I signals 5 and the Q signals 6 of the respective subcarriers to frequency conversion corresponding to each subcarrier so that both the I signals 5 and the Q signals 6 of the respective subcarriers have the same center frequency. The state of such frequency conversion is illustrated in FIGS. 2A to 2C. The frequency (see FIG. 2A) shifted from the center, for example, by $\pm\Delta\omega$ is moved by $\mp\Delta\omega$ through the processing by the frequency converter so that the subcarrier is converted into a state shown in FIG. 2B.

Signals 39 to 46 processed by the frequency converters 7 to 10 are inputted to the waveform shaping filters 11 to 18. Each of the waveform shaping filters 11 to 18 is provided with a characteristic capable of deriving or extracting a signal in a frequency range, as shown by a square in FIG. 2B, which has a fixed width around the center frequency. As a result, a signal shown in FIG. 2C is extracted by the waveform shaping filter.

The outputs of the waveform shaping filters 11 to 18 are respectively squared by the squaring circuits 27 to 34 to determine envelopes. The outputs of the squaring circuits 27 to 34 are added by the adder 35 to determine the sum of the envelopes of the four subcarriers.

A value determined by the adder 35 is added by the adding circuit 36 to the previous value stored in the memory 37. The memory 37 has previous cumulative values stored separately for sampling intervals 1 to 7 corresponding to the number 7 of samples in the over-sampling. When a value obtained by the adder 35 is one in the sampling interval 2, the previous cumulative value of the sampling interval 2 is read from the memory 37. The read cumulative value and the value obtained by the adder 35 are added by the adding circuit 36. The result of addition is again stored into a location of the memory 37 where the cumulative value of the sampling interval 2 is to be stored.

The above addition is made for a certain time. The decision point detecting circuit 38 detects the maximum value from among the values of addition stored in the memory 37 for the respective sampling intervals as the results of addition for the certain time. A sample corresponding to a sampling interval providing the maximum value is identified as the optimum sample for symbol reproduction.

In the conventional synchronous adder device, however, it is required for the determination of the envelopes of the four subcarriers that the frequency conversion process should be performed four times and each of the filtering process and the squaring process should be performed eight times. Namely, it is necessary to perform the frequency conversion process by the number of times which is equal to the number of subcarriers and to perform each of the filtering process and the squaring process by the number of times which is twice as large as the number of subcarriers.

There is a problem that an attempt to cope with such a large quantity of frequency conversion process, filtering process and so forth by the extension of a hardware results in an increase in circuit scale and an attempt at realization by a software results in the difficulty of the processing in a real time.

SUMMARY OF THE INVENTION

An object of the present invention is to solve the above-mentioned problem of the prior art or to provide a synchronous adder device in which the same function as the conventional device can be performed with a small-scale circuit construction.

To that end, a synchronous adder device of the present invention comprising A/D conversion means for sampling/digitizing a receive signal transmitted through a plurality of subcarriers and means for determining the value of synchronous addition for each sample is provided with a synthetic waveform shaping filter for waveform-shaping every other subcarrier, squaring means for squaring an output of the synthetic waveform shaping filter, and a low pass filter for removing a higher harmonic component from the sum of outputs of the squaring means.

With such a construction, in the case where the signal is transmitted through four subcarriers, synchronous addition becomes possible by using the synthetic waveform shaping filters the number of which is two for each of an I signal and a Q signal or is four in total. The number of squaring means equal to the number of synthetic waveform shaping filters suffices.

Though an output of the squaring means includes an envelope component and a higher harmonic component since the squaring means squares signals of the plurality of subcarriers together or collectively, the higher harmonic component can be removed by the low pass filter, thereby making it possible to extract only the envelope component.

Since the synthetic waveform shaping filter extracts every other subcarrier, the leakage of a higher harmonic component into an envelope caused by the squaring is little. As a result, accurate synchronous addition becomes possible.

BRIEF DESCRIPTION OF THE DRAWINGS

FIG. 3 is a block diagram showing the construction of a synchronous adder device according to an embodiment of the present invention.

DESCRIPTION OF THE PREFERRED EMBODIMENTS

Figure 1:
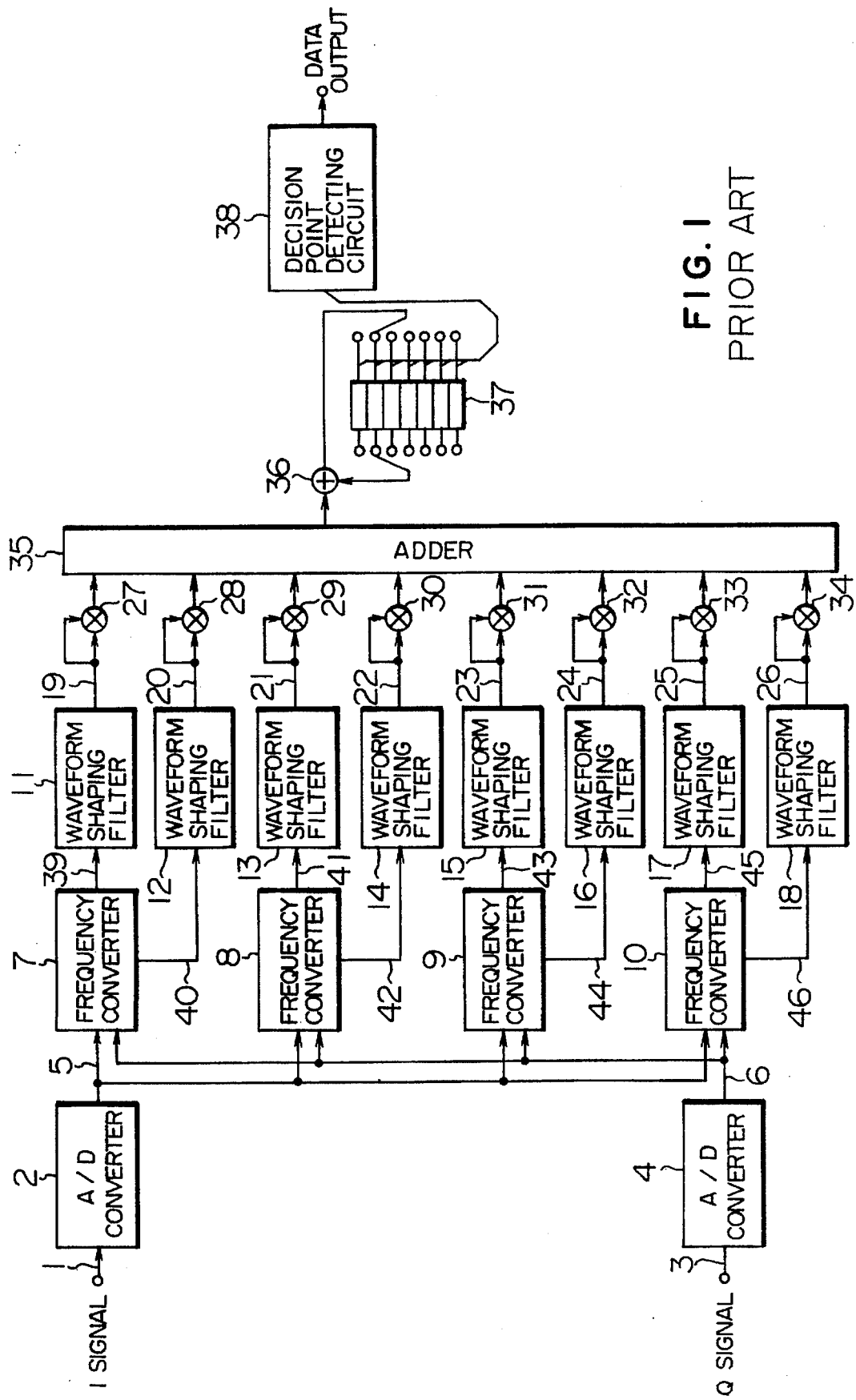
FIG. 1 is a block diagram showing the construction of the conventional synchronous adder device.
Figure 2A:
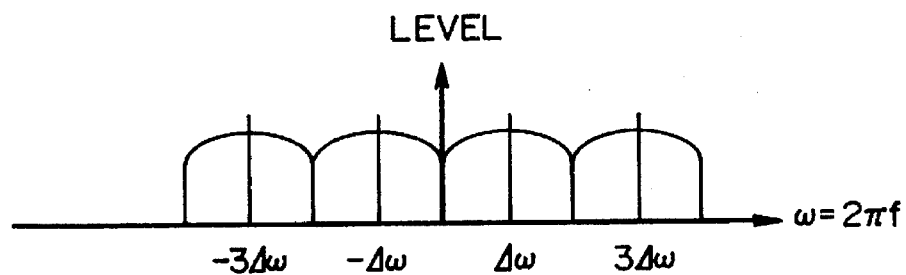
FIGS. 2A to 2C are diagrams showing the frequency allocation of subcarriers for explaining the operation of the conventional synchronous adder device.
Figure 2B:
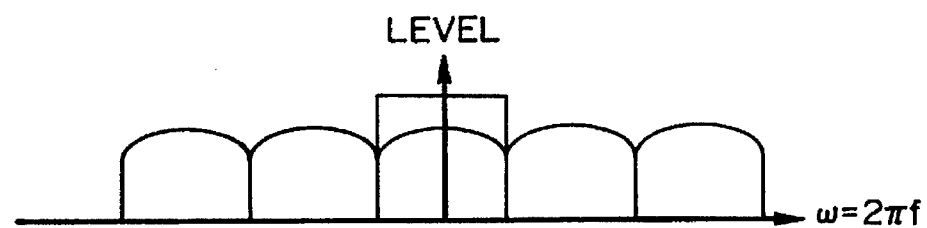
Figure 2C:
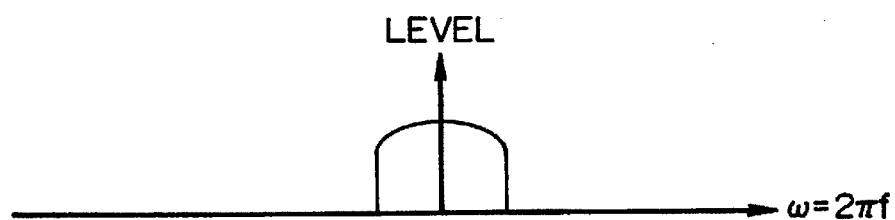

A synchronous adder device according to an embodiment of the present invention is shown in FIG. 3. The device includes A/D converters 52 and 53 for digitizing an input I signal 50 and an input Q signal 51, respectively, by sampling them at a rate which is integer times as high as a symbol rate, frequency converters 54 and 55 for performing frequency conversion to adapt the frequency of the input signal to a frequency characteristic of the subsequent synthetic waveform shaping filter, synthetic waveform shaping filters 56 to 59 having a waveform shaping characteristic for every other subcarrier, squaring circuits 60 to 63 for squaring the respective outputs of the synthetic waveform shaping filters 56 to 59, an adder 64 for adding the outputs of the squaring circuits 60 to 63, a low pass filter (LPF) 65 for removing a higher harmonic component from an output of the adder 64, the higher harmonic component being generated in the squaring process, an adder circuit 66 for adding an output of the LPF 65 to a cumulative value stored in a memory 67, the memory 67 for storing a cumulative value for each sampling interval, and a decision point detecting circuit 68 for detecting, a sample from which a transmit symbol is to be reproduced, from the maximum value of the cumulative values for the respective sampling intervals.

Figure 4A:
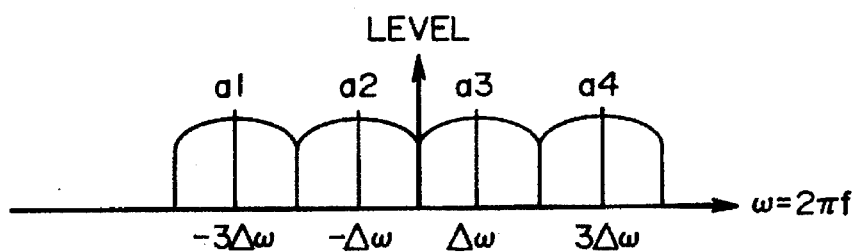
FIGS. 4A to 4G are diagrams showing the frequency allocation of subcarriers for explaining the operation of the synchronous adder device according to the embodiment of the present invention.

The A/D converter 52 or 53 of this device is inputted with an in-phase component (or I signal) 50 or a quadrature component (or Q signal) 51 of a receive signal transmitted through four subcarriers a1, a2, a3 and a4 which have their frequencies shifted from a center frequency by $-3\Delta\omega$, $-\Delta\omega$, $\Delta\omega$ and $3\Delta\omega$, as shown in FIG. 4A. The A/D converter 52 and 53 digitize the input signal at a sampling rate which is integer times as high as the symbol rate.

The outputs 69 and 70 of the A/D converters 52 and 53 are inputted to the frequency converters 54 and 55, respectively. The frequency converter 54 converts or moves the frequency of the input signal by $+\Delta\omega$, as shown in FIG. 4B, and the frequency converter 55 converts the frequency of the input signal by $-\Delta\omega$, as shown in FIG. 4D.

The I and Q signals 71 and 72 frequency-converted by the frequency converter 54 are inputted to the synthetic waveform shaping filters 56 and 57, respectively. Similarly, the I and Q signals 73 and 74 frequency-converted by the frequency converter 55 are inputted to the synthetic waveform shaping filters 58 and 59, respectively.

Figure 4B:
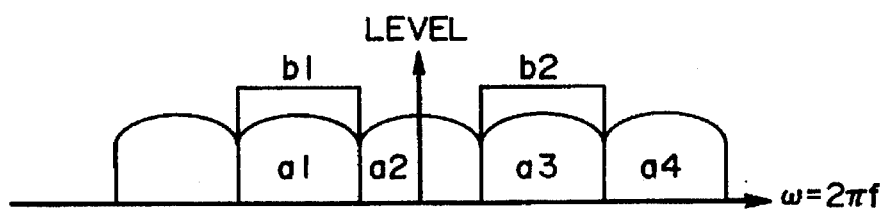
Figure 4C:
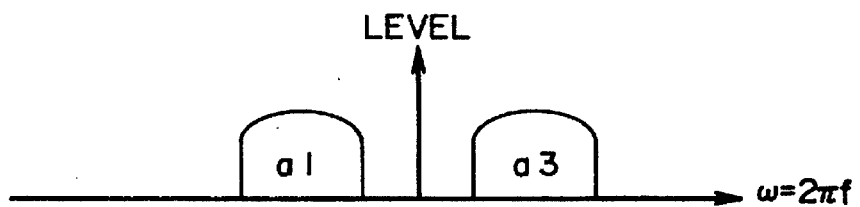
Figure 4D:
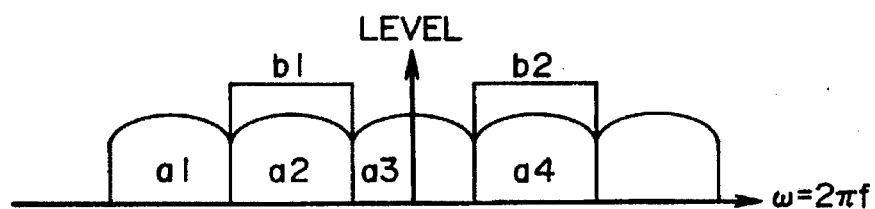

Each of the synthetic waveform shaping filters 56 to 59 has a characteristic with which the waveform shaping of every other subcarrier is performed as shown by b1 and b2 in FIGS. 4B and 4D. The I and Q signals 75 and 76 waveform-shaped by the synthetic waveform shaping filters 56 and 57 have waveforms shown in FIG. 4C, and the I and Q signals 77 and 78 waveform-shaped by the synthetic waveform shaping filters 58 and 59 have waveforms shown in FIG. 4E.

Signals 75 to 78 outputted from the synthetic waveform shaping filters 56 to 59 are respectively squared by the squaring circuits 60 to 63 and are then added by the adder 64.

Figure 4E:
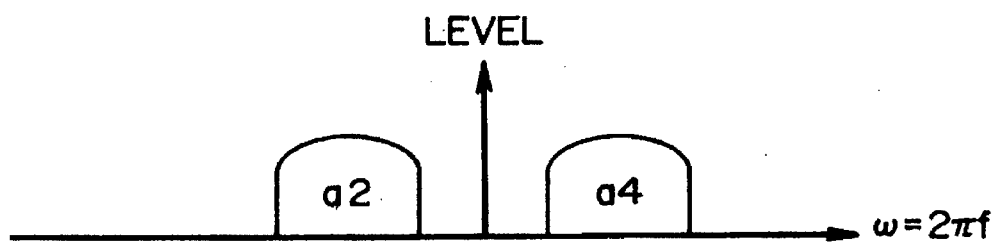
Figure 4F:
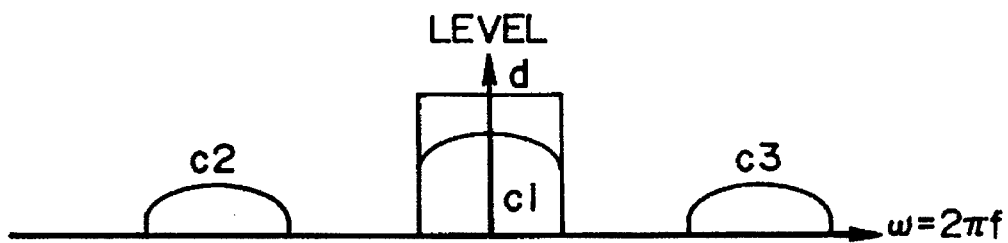
Figure 4G:
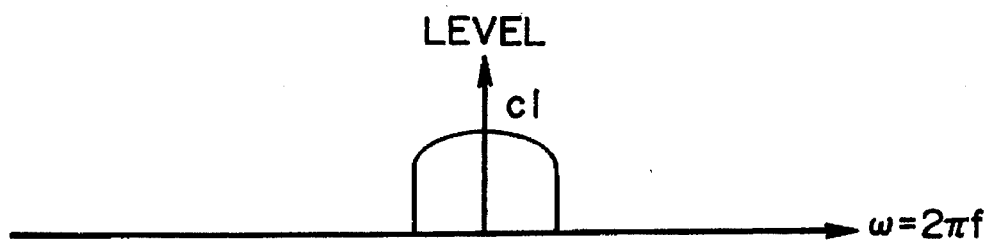

By virtue of the squaring process in the squaring circuits 60 to 63, an output of the adder 64 includes not only an envelope component c1 but also harmonic components c2 and c3 which are four times as high as the envelope component, as shown in FIG. 4F. These harmonic components c2 and c3 are removed by a low pass filter having a filtering characteristic shown by $\underline{d}$ in FIG. 4F so that only an envelope component shown in FIG. 4G is inputted to the adding circuit 66.

The operations of the adding circuit 66, the memory 67 and the decision point detecting circuit 68 are the same as those in the conventional device shown in FIG. 1.

A process until the envelope signal is obtained in the present synchronous adder device will now be explained by use of mathematical expressions.

A receive signal transmitted to the device through four subcarriers can be represented by A in the following equation (1). Suffixes "1", "2", "3" and "4" in the equation (1) represent 1, 2, 3 and 4 of the subcarriers a1, a2, a3 and a4. The equation (1) is written using relations shown by equations (2) to (5). In the equation (1), $\Delta\omega$ is represented by $\delta\theta$.

$$A = a_1 e^{j\theta_1} \cdot e^{-j3\delta\omega t} + a_2 e^{j\theta_2} \cdot e^{-j\delta\omega t} + a_3 e^{j\theta_3} \cdot e^{j\delta\omega t} + a_4 e^{j\theta_4} \cdot e^{j3\delta\omega t} \quad \text{---(1)}$$

$$i_1 + jq_1 = a_1 e^{j\theta_1} \quad \text{---(2)}$$

$$i_2 + jq_2 = a_2 e^{j\theta_2} \quad \text{---(3)}$$

$$i_3 + jq_3 = a_3 e^{j\theta_3} \quad \text{---(4)}$$

$$i_4 + jq_4 = a_4 e^{j\theta_4} \quad \text{---(5)}$$

Since the receive signal involves a frequency offset, a receive signal with the frequency offset $\omega(\text{off})$ taken into consideration can be represented in a form A' shown by the following equation (6):

$$a' = A \times e^{j\omega(\text{off})t} \quad \text{---(6)}$$

The frequency converter 54 provides the frequency conversion of $+\Delta\omega$ to the signal A'. A signal $A_1'$ outputted from the frequency converter 54 is represented by the following equation (7):

$$A_1' = A \times e^{j\delta\omega t} \times e^{j\omega(\text{off})t} \quad \text{---(7)}$$

On the other hand, the frequency converter 55 provides the frequency conversion of $-\Delta\omega$ to the signal A' represented by the equation (6). A signal $A_2'$ outputted from the frequency converter 55 is represented by the following equation (8):

$$A_2' = A \times e^{-j\delta\omega t} \times e^{j\omega(\text{off})t} \quad \text{---(8)}$$

The synthetic waveform shaping filters 56 and 57 waveform-shape the signal of the equation (7) to leave the subcarrier 1 (a1 in FIG. 4C) and the subcarrier 3 (a3 in FIG. 4C). As a result, a signal $A_{1F}'$ outputted from the synthetic waveform shaping filters 56 and 57 is as follows:

$$A_{1F}' = (a_1 e^{j\theta_1} \cdot e^{-j2\delta\omega t} + a_3 e^{j\theta_3} \cdot e^{j2\delta\omega t}) \times e^{j\omega(\text{off})t} \quad \text{---(9)}$$

On the other hand, the synthetic waveform shaping filters 58 and 59 waveform-shape the signal of the equation (7) to leave the subcarrier 2 (a2 in FIG. 4E) and the subcarrier 4 (a4 in FIG. 4E). As a result, a signal $A_{2F}'$ outputted from the synthetic waveform shaping filters 58 and 59 is as follows:

$$A_{2F}' = (a_2 e^{j\theta_2} \cdot e^{-j2\delta\omega t} + a_4 e^{j\theta_4} \cdot e^{j2\delta\omega t}) \times e^{j\omega(\text{off})t} \quad \text{---(10)}$$

The I signal outputted from the synthetic waveform shaping filter 56 is squared by the squaring circuit 60, and the Q signal outputted from the synthetic waveform shaping filter 57 is squared by the squaring circuit 61. The sum of signals outputted from the squaring circuits 60 and 61 is represented by the following equation (11):

$$\begin{aligned}
|A_{1F}^2| &= A_{1F}' \times A_{1F}'^* \quad \text{(11)} \\
&= (a_1 e^{j\theta_1} \cdot e^{-j2\delta\omega t} + a_3 e^{j\theta_3} \cdot e^{j2\delta\omega t}) \times \\
&\quad e^{j\omega(\text{off})t} \times (a_1 e^{-j\theta_1} \cdot e^{j2\delta\omega t} + \\
&\quad a_3 e^{-j\theta_3} \cdot e^{-j2\delta\omega t}) \times e^{-j\omega(\text{off})t} \\
&= a_1^2 + a_3^2 + a_1 a_3 e^{-j4\delta\omega t} \cdot e^{j(\theta_1 - \theta_3)} + \\
&\quad a_3 a_1 e^{j4\delta\omega t} \cdot e^{j(\theta_3 - \theta_1)} \\
&= (i_1^2 + q_1^2 + i_3^2 + q_3^2) + (i_1 i_3 + \\
&\quad q_1 q_3) \cos(4\delta\omega_t)
\end{aligned}$$

Also, the I signal outputted from the synthetic waveform shaping filter 58 is squared by the squaring circuit 62, and the Q signal outputted from the synthetic waveform shaping filter 59 is squared by the squaring circuit 63. The sum of signals outputted from the squaring circuits 62 and 63 is represented by the following equation (12):

$$\begin{aligned}
|A_{2F}^2| &= A_{2F}' \times A_{2F}'^* \quad \text{(12)} \\
&= (a_2 e^{j\theta_2} \cdot e^{-j2\delta\omega t} + a_4 e^{j\theta_4} \cdot e^{j2\delta\omega t}) \times \\
&\quad e^{j\omega(\text{off})t} \times (a_2 e^{-j\theta_2} \cdot e^{j2\delta\omega t} + \\
&\quad a_4 e^{-j\theta_4} \cdot e^{-j2\delta\omega t}) \times e^{-j\omega(\text{off})t} \\
&= a_2^2 + a_4^2 + a_2 a_4 e^{-j4\delta\omega t} \cdot e^{j(\theta_2 - \theta_4)} + \\
&\quad a_4 a_2 e^{j4\delta\omega t} \cdot e^{j(\theta_4 - \theta_2)} \\
&= (i_2^2 + q_2^2 + i_4^2 + q_4^2) + (i_2 i_4 + \\
&\quad q_2 q_4) \cos(4\delta\omega_t)
\end{aligned}$$

A square sum outputted from the adder 64 for all the subcarriers is the addition of the equations (11) and (12), that is, as follows:

$$\begin{aligned}
&(i_1^2 + q_1^2) + (i_2^2 + q_2^2) + (i_3^2 + q_3^2) + ((i_4^2 + q_4^2) + \{(i_1 i_3 + q_1 q_3) + (i_2 i_4 + q_2 q_4)\} \\
&\cos(4\delta\omega t) \quad \text{---(13)}
\end{aligned}$$

As apparent from the expression (13), the result of squaring includes an envelope $(i_1^2 + q_1^2) + (i_2^2 + q_2^2) + (i_3^2 + q_3^2) + (i_4^2 + q_4^2)$ and the fourth harmonic component. This harmonic component is removed by the LPF 65. As a result, only envelope data represented by the following expression (14) is sent to the adder 66:

$$(i_1^2 + q_1^2) + (i_2^2 + q_2^2) + (i_3^2 + q_3^2) + (i_4^2 + q_4^2) \quad \text{---(14)}$$

Thus, the synchronous adder device of the present embodiment obtains the envelope data by using two frequency conveters, four synthetic waveform shaping filters, four squaring circuits for squaring the respective outputs of the synthetic waveform shaping filters, and a low pass filter for removing a higher harmonic component generated by the squaring. The circuit scale of the device of the present embodiment is remarkably small as compared with that of the conventional device shown in FIG. 1.

Also, in the synchronous adder device of the present embodiment, every other subcarrier is extracted by the synthetic waveform shaping filter and is then squared by the squaring circuit. Therefore, the leakage of harmonic components to an envelope becomes little. As a result, the design of the low pass filter becomes simple.

We claim:

1. A synchronous adder device for detecting a total level of a plurality of subcarriers of an input signal, said synchronous adder device comprising:

a plurality of filter means each for extracting from the input signal at least two of said plurality of subcarriers which are adjacent to another of said plurality of subcarriers;

a plurality of squaring means for squaring outputs of said plurality of filter means respectively to obtain outputs comprising desired components, each of said desired components having an amplitude corresponding to a sum of squared levels of said at least two of said plurality of subcarriers;

adding means for adding said outputs of said plurality of squaring means; and a low pass filter for removing harmonic components other than said desired components from an output of said adding means.

2. A synchronous adder device according to claim 1, wherein said input signal includes an I signal and a Q signal.

3. A synchronous adder device according to claim 1, further comprising:

a first frequency converter for increasing a frequency of each of said plurality of subcarriers by a predetermined frequency to obtain a plurality of frequency-increased subcarriers and for applying said plurality of frequency-increased subcarriers to a first subplurality of said plurality of filter means; and a second frequency converter for decreasing a frequency of each of said plurality of subcarriers by said predetermined frequency to obtain a plurality of frequency-decreased subcarriers and for applying said plurality of frequency-decreased subcarriers to a second subplurality of said plurality of filter means.

4. A synchronous adder device for detecting a total level of a plurality of subcarriers of an input signal, said synchronous adder device comprising:

A/D converter means for digitizing said input signal by sampling said input signal at a rate which is an integer number of times as high as a symbol rate of said input signal to obtain a digitized input signal;

a plurality of filter means each for extracting from the digitized input signal at least two of said plurality of subcarriers which are adjacent to another of said plurality of subcarriers;

a plurality of squaring means for squaring outputs of said plurality of filter means respectively to obtain outputs comprising desired components, each of said desired components having an amplitude corresponding to a sum of squared levels of said at least two of said plurality of subcarriers;

adding means for adding said outputs of said plurality of squaring means; and a low pass filter for removing harmonic components other than said desired components from an output of said adding means.

5. A synchronous adder device according to claim 4, wherein said input signal includes an I signal and a Q signal.

6. A synchronous adder device according to claim 4, wherein said A/D converter means digitizes said input signal over a plurality of sampling intervals, and said adder device further comprises:

a memory for storing a plurality of cumulative values, one for each of said plurality of sampling intervals;

second adding means for adding an output of said low pass filter to one of the cumulative values stored in said memory; and decision point detecting means for detecting a sample, from which a transmit symbol is to be reproduced, from a maximum value of said plurality of cumulative values.

7. A synchronous adder device according to claim 5, wherein said A/D converter means digitizes said input signal over a plurality of sampling intervals, and said adder device further comprises:

a memory for storing a plurality of cumulative values, one for each of said plurality of sampling intervals;

second adding means for adding an output of said low pass filter to one of the plurality of cumulative values stored in said memory; and decision point detecting means for detecting a sample, from which a transmit symbol is to be reproduced, from a maximum value of said plurality of cumulative values.

8. A synchronous adder device according to claim 4, further comprising:

a first frequency converter for increasing a frequency of each of said plurality of subcarriers by a predetermined frequency to obtain a plurality of frequency-increased subcarriers and for applying said plurality of frequency-increased subcarriers to a first subplurality of said plurality of filter means; and a second frequency converter for decreasing a frequency of each of said plurality of subcarriers by said predetermined frequency to obtain a plurality of frequency-decreased subcarriers and for applying said plurality of frequency-decreased subcarriers to a second subplurality of said plurality of filter means.

* * * * *